(12) United States Patent
Cheng

(10) Patent No.: US 11,622,171 B2
(45) Date of Patent: Apr. 4, 2023

(54) IMAGE SENSOR APPARATUS AND CORRESPONDING METHOD CAPABLE OF AUTOMATICALLY ADJUSTING SIGNAL TIMING MARGINS IN RESPONSE TO DIFFERENT CIRCUIT ROUTING DESIGNS

(71) Applicant: PixArt Imaging Inc., Hsin-Chu (TW)

(72) Inventor: Hsin-Chi Cheng, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 4 days.

(21) Appl. No.: 17/403,859

(22) Filed: Aug. 16, 2021

(65) Prior Publication Data
US 2023/0049466 A1    Feb. 16, 2023

(51) Int. Cl.
*H04N 5/232*   (2006.01)
*H04N 23/60*   (2023.01)
(52) U.S. Cl.
CPC .................. *H04N 23/665* (2023.01)

(58) Field of Classification Search
CPC .................................................. H04N 5/23227
See application file for complete search history.

(56) References Cited

U.S. PATENT DOCUMENTS

2019/0066806 A1*  2/2019  Chai .................... H03K 3/0322

* cited by examiner

*Primary Examiner* — Twyler L Haskins
*Assistant Examiner* — Fayez A Bhuiyan
(74) *Attorney, Agent, or Firm* — Winston Hsu

(57) ABSTRACT

A method of an image sensor apparatus to be externally coupled to an external circuit through a circuit routing design includes: generating and outputting the clock signal and sensor data signals; and compensating an unbalance of the circuit routing design by automatically determining resultant delay amounts for the sensor data signals, applying a preliminary delay amount into the clock signal and applying the resultant delay amounts into the sensor data signals to generate and output delayed clock signal and delayed sensor data signals to the external circuit through the circuit routing design.

13 Claims, 9 Drawing Sheets

IMAGE SENSOR APPARATUS AND CORRESPONDING METHOD CAPABLE OF AUTOMATICALLY ADJUSTING SIGNAL TIMING MARGINS IN RESPONSE TO DIFFERENT CIRCUIT ROUTING DESIGNS

BACKGROUND OF THE INVENTION

1. Field of the Invention

The invention relates to an image sensing mechanism, and more particularly to an image sensor apparatus and corresponding method.

2. Description of the Prior Art

Generally speaking, a conventional image sensor device are arranged to generate and output a clock signal and sensor data signals to a microcontroller outside the device via a circuit routing design such as PCB (printed circuit board) routing line/traces. The clock signal and sensor data signals are transmitted through the circuit routing design by a parallel communication interface. However, due to the unbalances of the circuit routing design or other circuit limitations, it is necessary for a user or a designer to manually adjust the circuit routing design or manually adjust the clock signal and sensor data signals by human eyes. It is not efficient to implement the conventional image sensor device.

SUMMARY OF THE INVENTION

Therefore one of the objectives of the invention is to provide an image sensor apparatus and a method of the image sensor apparatus to solve the above-mentioned problems.

According to an embodiment, an image sensor apparatus to be externally coupled to an external circuit through a circuit routing design is disclosed. The apparatus comprises a processing circuit and an adjusting circuit. The processing circuit is arranged for generating and outputting the clock signal and sensor data signals. The adjusting circuit is coupled to the processing circuit, and is arranged for compensating an unbalance of the circuit routing design by automatically determining resultant delay amounts for the sensor data signals, applying a preliminary delay amount into the clock signal and applying the resultant delay amounts into the sensor data signals to generate and output delayed clock signal and delayed sensor data signals to the external circuit through the circuit routing design.

According to an embodiment, a method of an image sensor apparatus to be externally coupled to an external circuit through a circuit routing design is disclosed. The method comprises: generating and outputting the clock signal and sensor data signals; and compensating an unbalance of the circuit routing design by automatically determining resultant delay amounts for the sensor data signals, applying a preliminary delay amount into the clock signal and applying the resultant delay amounts into the sensor data signals to generate and output delayed clock signal and delayed sensor data signals to the external circuit through the circuit routing design.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution of an integrated circuit device/component capable of automatically adjusting or calibrating the signal delays of a plurality of communication signals, which are to be parallel outputted to an external circuit via PCB (printed circuit board) routing lines/traces, by respectively delaying the periods (or shifting the phases) of these communication signals with identical, partially different, or different delay amounts, to increase, extend, or maximize a valid range of these received communication signals to make the other signals in the communication signals, seen and received by the external circuit, be correctly sampled by using a clock signal in the communication signal as far as possible; the valid range will be described later. This technical solution can effectively compensate or calibrate the unbalance of a circuit routing design between the image sensor apparatus and an external circuit, e.g. PCB routing unbalances.

The integrated circuit component for example is an image sensor apparatus (not limited) which outputs communication signals carrying data (or sensor data), that include the clock signal, synchronization signal(s), and pixel/image/frame data signals, to a microcontroller (MCU); however, this is not intended to be a limitation. The clock signal may also be referred to as a clock data signal, and the synchronization signal(s) may be referred to as synchronization data signal(s).

Figure 1:
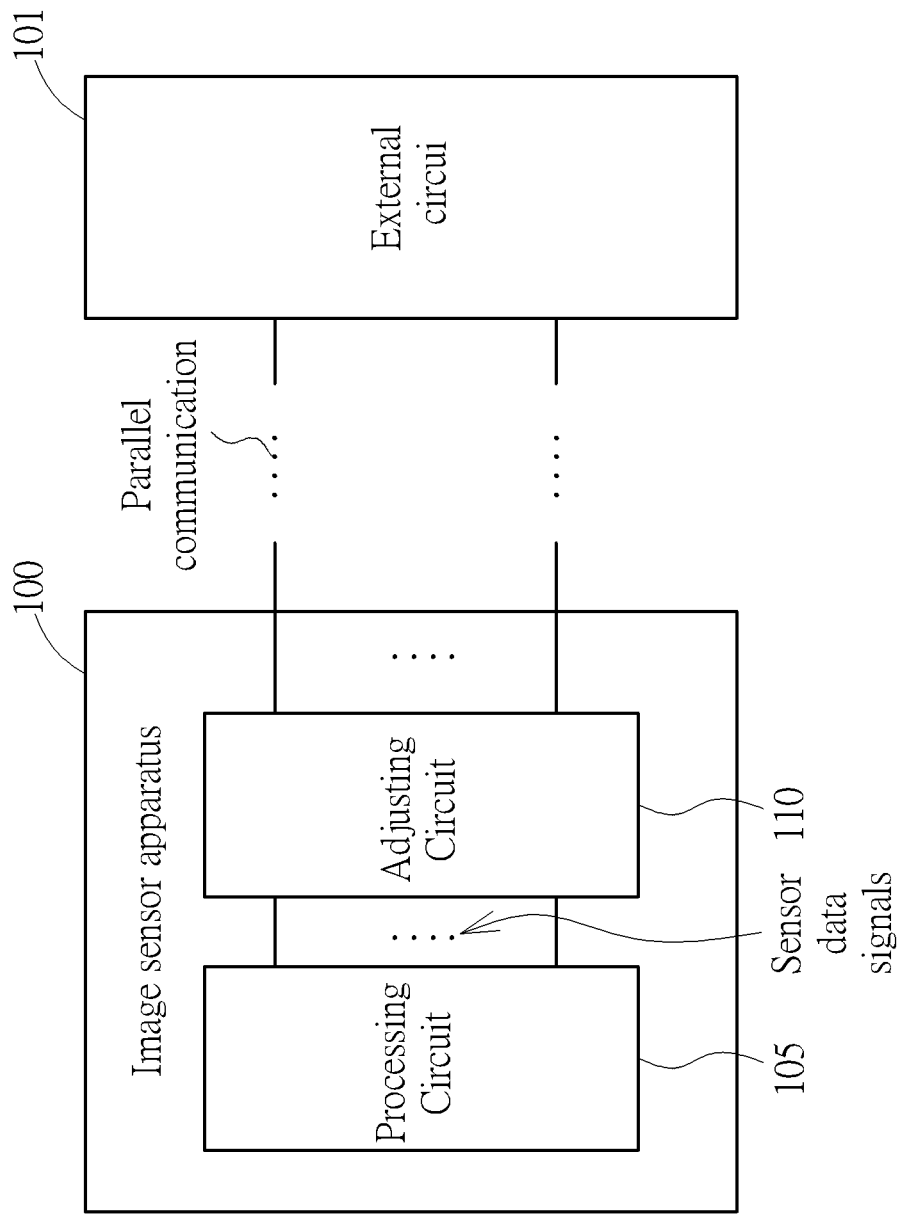
FIG. 1 is a block diagram of an image sensor apparatus according to an embodiment of the invention.

FIG. 1 is a block diagram of an image sensor apparatus 100 according to an embodiment of the invention. The image sensor apparatus 100 is used to be externally coupled to an external circuit 101, and it comprises a processing circuit 105 and an adjusting circuit 110. The image sensor apparatus 100 for example is an image sensor circuit such as an integrated circuit chip which can be disposed on a printed circuit board (PCB) to be connected to the external circuit 101 which may be also disposed on the same PCB board (but not limited). The image sensor apparatus 100 is arranged to communicate with the external circuit 101 via a specific interface having multiple parallel synchronous communication signal lines such as the general purpose input/output (GPIO) interface having multiple ports/pins; however, this is not meant to be a limitation, and other interface standards may be also suitable. The image sensor apparatus 100 for example can use such interface to output and transmit a plurality of sensor data signals from the image sensor apparatus 100 to the external circuit 101. Also, the image sensor apparatus 100 can receive signals which are parallel transmitted from the external circuit 101.

Actually, the plurality of sensor data signals are transmitted and transferred respectively via different routing lines/traces on the PCB board based on the different PCB routing design/requirements. The lengths of the different routing lines/traces may be different or partially different, and this actually causes that the signals transmitted by the different parallel communication lines of the specific interface may have different signal delays. For the external circuit 101, it will be more difficult to correctly sample, determine and obtain the signals received by the external circuit 101 if the received signals are associated with a narrower valid range.

The image sensor apparatus 100 using the adjusting circuit 110 is capable of automatically adjusting the delays/phases of the sensor data/digital signals which are generated by the processing circuit 105 and then parallel outputted to the external circuit 101 via the lines/traces of the PCB board so as to make the signals received by the external circuit 101 are associated with a broader or wider valid range. Thus, the external circuit 101 can easily and correctly sample, determine and obtain the received sensor data signals. In addition, it is not needed and necessary for a user or operator to manually adjust the phases and delays of the image sensor apparatus 100 and/or manually adjust the PCB routing designs. The arrangement of the lines/traces of the PCB routing will become easier.

Figure 2:
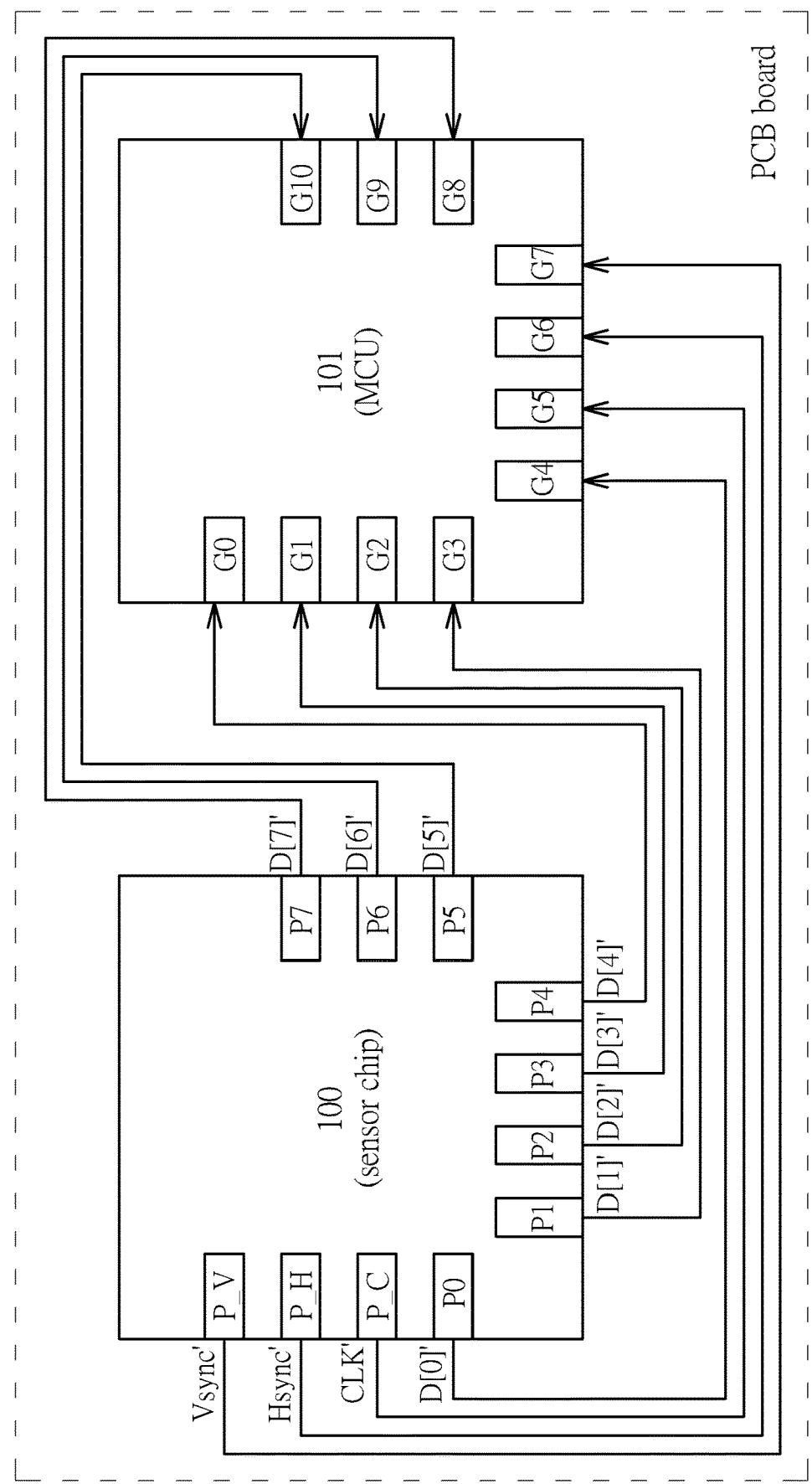
FIG. 2 is a diagram showing an example of the image sensor apparatus implemented on the PCB board and connected to the external circuit via PCB routing lines/traces according to an embodiment of the invention.

FIG. 2 is a diagram showing an example of the image sensor apparatus 100 implemented on the PCB board and connected to the external circuit 101 via PCB routing lines/traces according to an embodiment of the invention. The processing circuit 105 may generate the sensor data signals comprising clock signal CLK, vertical synchronization signal Vsync, horizontal synchronization signal Hsync, and bit data signals D[0]-D[7] which are not shown in FIG. 2. In FIG. 2, for example, the sensor data signals, which have been calibrated by the adjusting circuit 110, comprise the clock signal CLK' outputted via the port/pin P_C, vertical synchronization signal Vsync' outputted via the port/pin P_V, horizontal synchronization signal Hsync' outputted via the port/pin P_H, and eight bit data signals such as D[0]'-D[7]' respectively outputted via the ports/pins P0-P7. These calibrated sensor data signals are outputted by the image sensor apparatus 100 such as a sensor chip, transferred via the different PCB routing lines/traces having different or partially different lengths, and then received by the external circuit 101 such as the MCU via different ports/pins G0-G10. It should be noted that each of bit data signals D[0]'-D[7]' carries one bit information, and the bit data signals D[0]'-D[7]' form an image/frame data signal D[7:0]' having eight bits. In other embodiment, the image data signal may include 12 bit data signals. The number of bit data signals is not intended to be a limitation.

Figure 3:
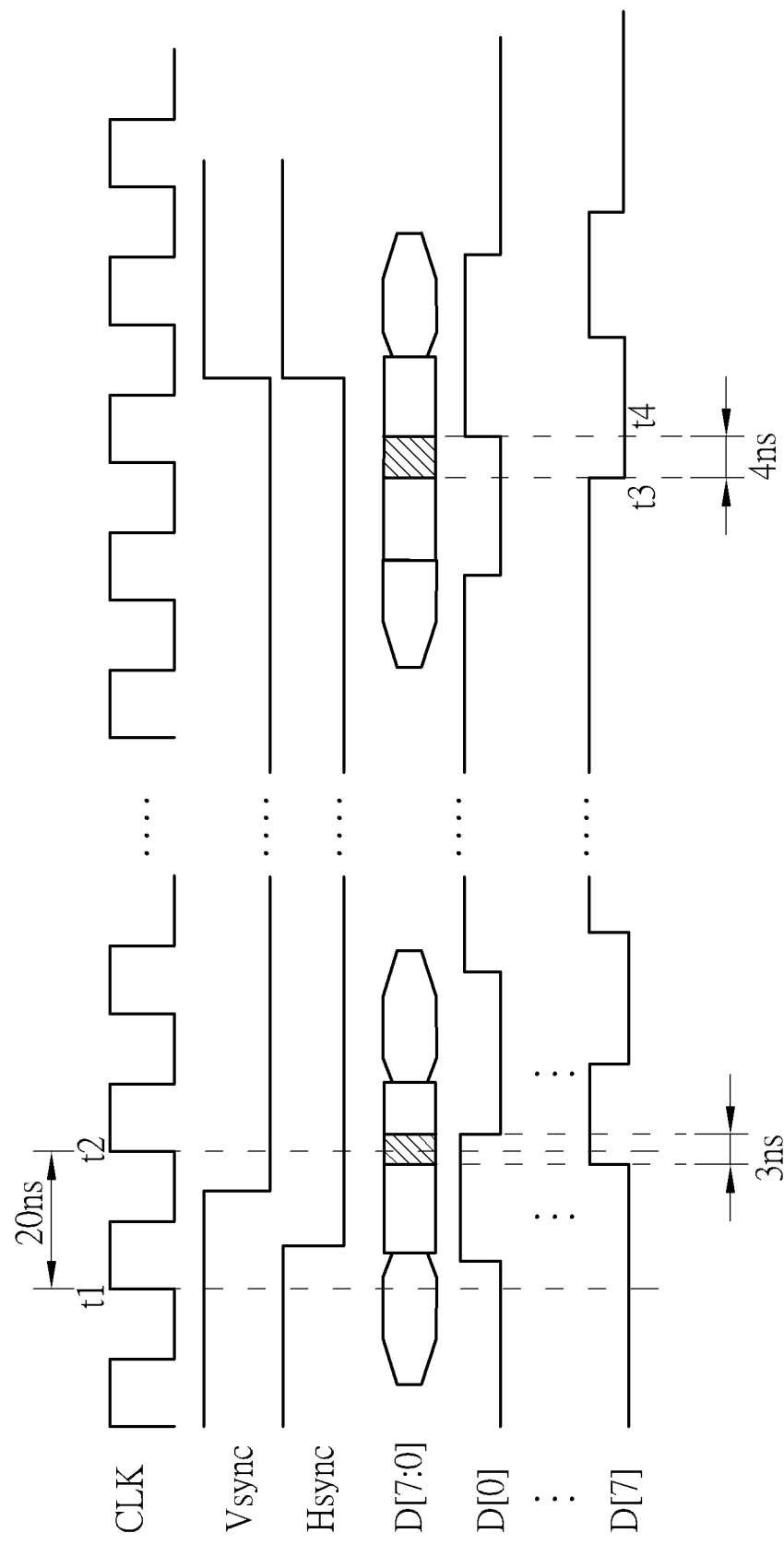
FIG. 3 is a diagram showing an example of the resultant waveforms of the conventional sensor data signals received by the external circuit 101, which are directly outputted by an image sensor device without a delay adjusting scheme and then transferred by the PCB routing of FIG. 2.
Figure 4:
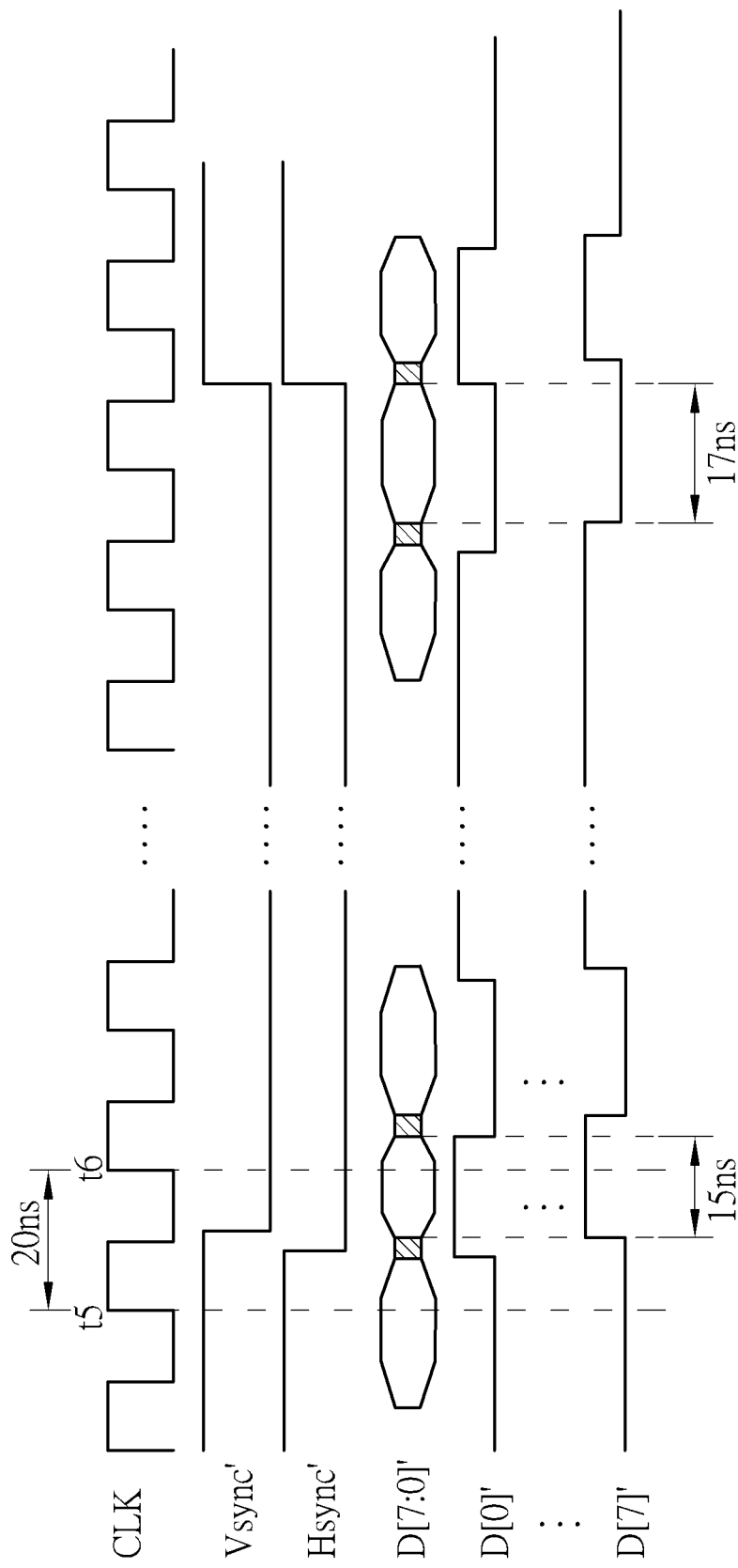
FIG. 4 is a diagram showing an example of the resultant waveforms of the sensor data signals received by the external circuit, which are outputted by the provided image sensor apparatus with the delay adjusting scheme and then transferred by the same PCB routing of FIG. 2, according to an embodiment of the invention.

To explain the narrower and wider valid ranges of signals as well as to make reader more clearly understand the improved performance of the image sensor apparatus 100, the comparison of the examples of FIG. 3 and FIG. 4 is provided. FIG. 3 is a diagram showing an example of the resultant waveforms of the conventional sensor data signals received by the external circuit 101, which are directly outputted by an image sensor device without a delay adjusting scheme and then transferred by the PCB routing of FIG. 2. FIG. 4 is a diagram showing an example of the resultant waveforms of the sensor data signals received by the external circuit 101, which are outputted by the image sensor apparatus 100 with the delay adjusting scheme and then transferred by the same PCB routing of FIG. 2, according to an embodiment of the invention. It should be noted that the examples of FIG. 3 and FIG. 4 are not intended to be limitations.

In FIG. 3, the clock signal CLK and other sensor data signals Vsync, Hsync, and D[7:0] are directly outputted from a conventional image sensor device and are not adjusted by the delay adjusting operation of the invention. Thus, the clock signal CLK and other data signals Vsync, Hsync, and D[7:0] may have different signal delays. When the clock signal CLK and other data signals Vsync, Hsync, and D[7:0] have been received by the external circuit 101, the external circuit 101 is arranged to sample and determine the other data signals such synchronization signals Vsync and Hsync and the bit data signals D[7:0] according to the timings of the signal edges (e.g. rising edges) of the clock signal CLK. The clock signal CLK for example may have the frequency of 50 MHz (but not limited), and its period is equal to 20 ns (nanoseconds). To explain the narrower and wider valid ranges of signals, it is assumed that the bit data signals D[7:0] respectively carry an identical alternating bit pattern such as '1010' or '0101' to make the readers more clearly understand the valid range. The external circuit 101 is arranged to sample the synchronization signals Vsync and Hsync each time when a rising edge (not limited) of the clock signal CLK occurs. Once the sampled levels of the synchronization signals Vsync and Hsync are low (not limited), the external circuit 101 determines that the bit data signals D[7:0] become valid.

In FIG. 3, for example, at timing t1, a rising edge of the clock signal CLK occurs and the sampled levels of signals Vsync and Hsync are high, the external circuit 101 determines that the bit data signals D[7:0] at this timing t1 are not valid. Then, at timing t2, another rising edge of the clock signal CLK occurs and the sampled levels of signals Vsync and Hsync are low, the external circuit 101 determines that the bit data signals D[7:0] at this timing t2 are valid and is arranged to sample the bit data signals D[7:0]. Ideally the bit data signals D[7:0] should be aligned with the clock signal CLK. However, actually, as shown in the example of the left of FIG. 3, the bit data signals D[7:0] respectively include different signal delays which are caused due to the different lengths of PCB routing lines/traces. In FIG. 3, the bit data signal D[0], seen and received by the external circuit 101, may have a signal edge such as rising edge which is earlier than the rising edges of the other bit data signals D[1]-D[7], and the bit data signal D[7], received by the external circuit 101, may have a signal edge such as rising edge which is later than the rising edges of the other bit data signals D[0]-D[6]. In this situation, a corresponding falling edge of the bit data signal D[0] may immediately occur in 3 ns after the rising edge of the bit data signal D[7]. Thus, to sample and obtain correct bit contents of all bit data signals, the valid range (i.e. valid period) becomes merely 3 ns, i.e. a narrower signal timing margin (or referred to as margin). It is more difficult for the external circuit 101 to correctly sample the bit data signals D[7:0] since the rising edge of the clock signal CLK may easily become out of the narrower margin due to any signal variations or circuit design unbalances.

Similarly, in the right example of FIG. 3, a falling edge of the bit data signal D[7] occurs at timing t3 while a rising edge of the bit data signal D[0] occurs at timing t4. That is, such rising edge of the bit data signal D[0] immediately occurs in 4 ns after the falling edge of the bit data signal D[7]. Thus, to obtain correct bit contents of all bit data signals, the valid range (i.e. valid period) becomes merely 0 ns, i.e. a narrower margin. It is also difficult for the external circuit 101 to correctly sample the bit data signals D[7:0] by using the narrower margin.

FIG. 4 shows the example of the larger/broader margins by using the provided delay adjusting scheme of the image sensor apparatus 100. As shown in FIG. 4, the clock signal CLK' and other data signals Vsync', Hsync', and D[7:0]' are signals delayed by the delay adjusting operation of the invention, then outputted from the image sensor apparatus 100, and finally seen and received by the external circuit 101. For example, at timing t5, a rising edge of the clock signal CLK' occurs and the sampled levels of signals Vsync' and Hsync' are high, the external circuit 101 determines that the bit data signals D[7:0]' at this timing t5 are not valid. Then, at timing t6, another rising edge of the clock signal CLK' occurs and the sampled levels of signals Vsync' and Hsync' are low, the external circuit 101 determines that the bit data signals D[7:0]' at this timing t6 are valid and is arranged to sample the bit data signals D[7:0]'. In this example, the bit data signals D[7:0]' may respectively include different signal delays which are compensated by the adjusting circuit 110 at first and then outputted to the external circuit 101 to be fitted to the different lengths of PCB routing lines/traces.

In the examples of FIG. 4, the bit data signals D[7:0]' also respectively carry an alternating bit pattern such as '1010' or '0101'. For instance, in the left example of FIG. 4, a corresponding falling edge of the bit data signal D[0]' occurs in 15 ns after the rising edge of the bit data signal D[7]'. To sample and obtain correct bit contents of all bit data signals, the valid range (i.e. valid period) becomes 15 ns, i.e. a larger margin. It is more easy for the external circuit 101 to correctly sample the bit data signals D[7:0]' even though any signal variations or circuit design unbalances occur. Similarly, in the right example of FIG. 4, a rising edge of the bit data signal D[0]' occurs in 17 ns after a falling edge of the bit data signal D[7]'. Thus, to obtain correct bit contents of all bit data signals, the valid range (i.e. valid period) becomes 17 ns, i.e. a larger margin. It is also easy for the external circuit 101 to correctly sample the bit data signals D[7:0]' by using the larger margin.

In practice, in one embodiment, the image sensor apparatus 100 may comprise a normal mode and an adjusting mode. After the image sensor apparatus 100 leaves the factory and is powered on, the image sensor apparatus 100 enters and operates in the adjusting mode to send and output training/test signals from its ports/pins to test the actual lengths of PCB routing lines/traces and then receive response signals to determine the resultant delay amounts which are used to compensate the different PCB routing lines/traces respectively. After determining the resultant delay amounts, the image sensor apparatus 100 can exit the adjusting mode and enter the normal mode to use the resultant delay amounts to respectively adjust or tune the delays/phases of the sensor data signals to maximize or increase the above-mentioned valid range for the external circuit 101 as far as possible. However, this is not intended to be a limitation. In other embodiment, the resultant delay amounts may be obtained/determined and then stored in the image sensor apparatus 100 before the image sensor apparatus 100 leaves the factory, and thus the image sensor apparatus 100 can directly enter the normal mode to calibrate the delays/phases of the sensor data signals when it is powered on.

For the embodiment supporting the adjusting mode and normal mode, the processing circuit 105 in the normal mode for example generates and outputs the raw clock signal CLK, raw data signals such as the synchronization signals Hsync and Vsync and bit data signals such as D[7:0]. It should be noted that the raw data signals carry the vertical and horizontal synchronization information and pixel image contents of images/frames, and they are generated when the image sensor apparatus 100 captures images/frames.

In the adjusting mode, the processing circuit 105 generates and outputs the clock signal CLK and a plurality of training data signals, each training data signal may be formed by a identical specific signal pattern signal APS such as an alternating bit pattern signal '1010' or '0101'; however, this is not intended to be a limitation. The plurality of training data signals may be different.

Further, in this embodiment, the processing circuit 105 in the adjusting mode generates the same signal pattern signals APS as the synchronization signals Hsync and Vsync and bit data signals such as D[7:0]. In other embodiments, each training data signal may be generated by using the raw clock signal CLK, and the generated training data signal has a period which is two times of that of the raw clock signal CLK.

Figure 5:
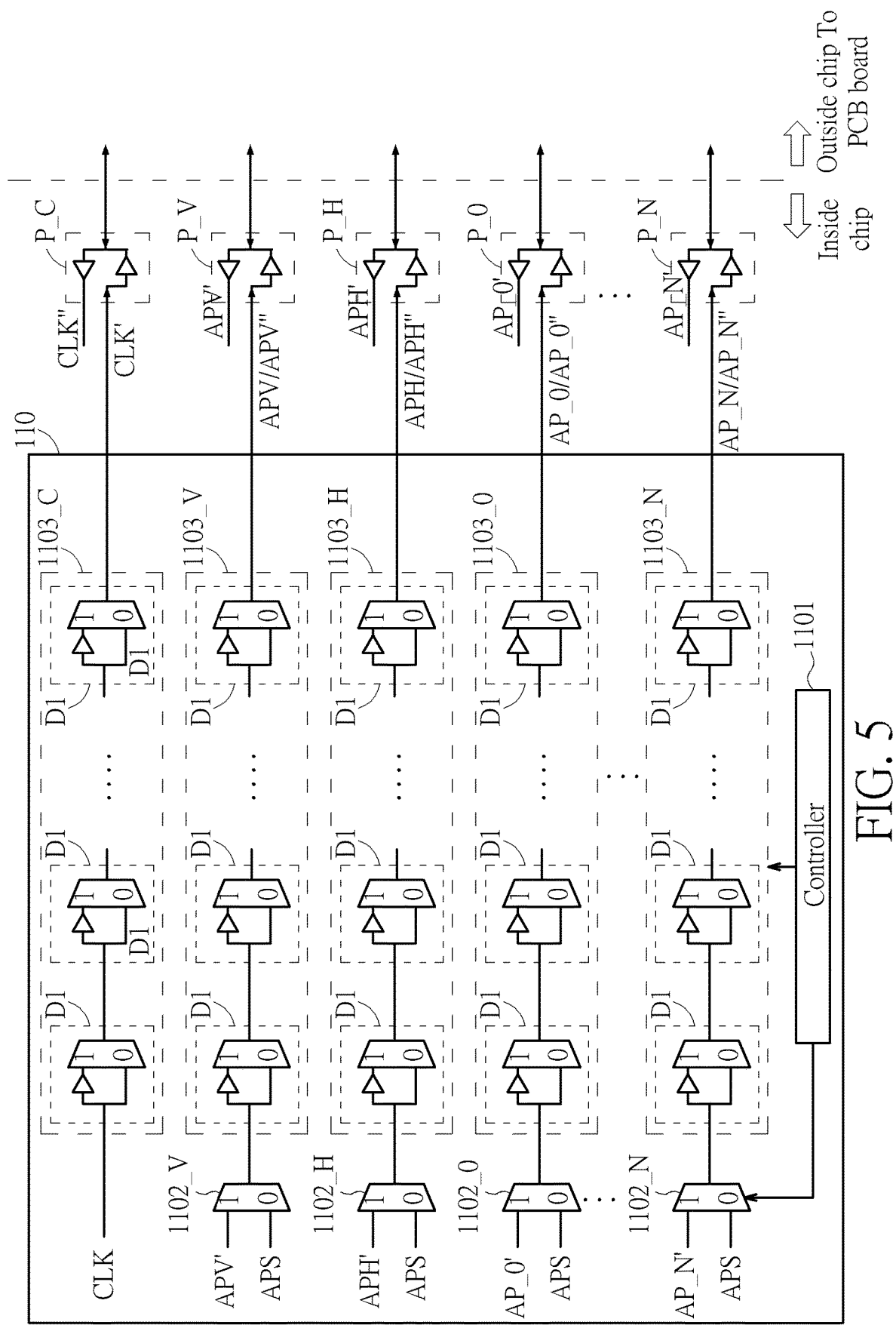
FIG. 5 is a diagram showing an example of the adjusting circuit in FIG. 1 when operating in the adjusting mode according to an embodiment of the invention.
Figure 6:
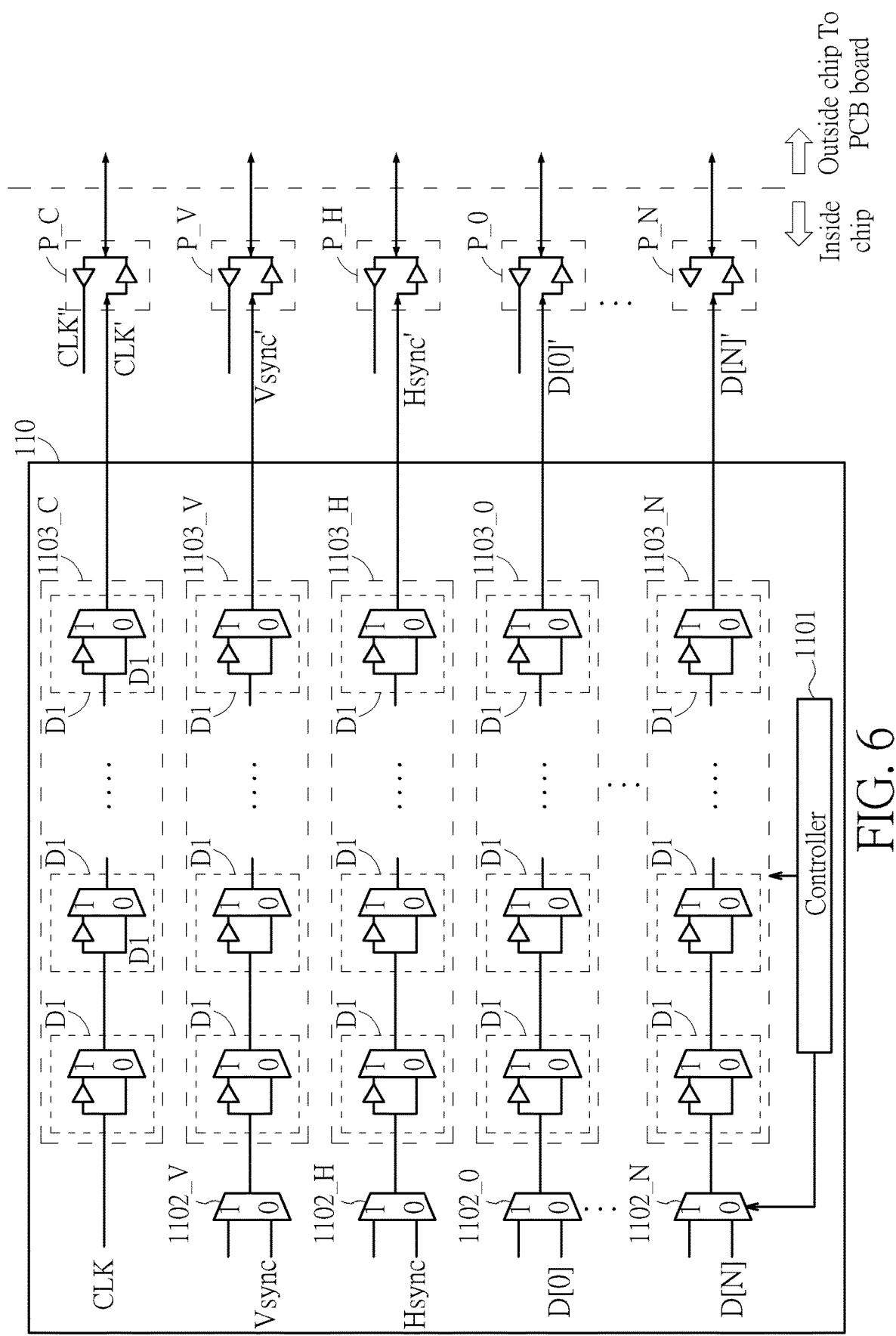
FIG. 6 is a diagram showing an example of the adjusting circuit in FIG. 1 when operating in the normal mode according to an embodiment of the invention.

In practice, the adjusting circuit 110 comprises a plurality delay path for respectively adjusting the delays/phases of the sensor data signals. FIG. 5 is a diagram showing an example of the adjusting circuit 110 in FIG. 1 when operating in the adjusting mode according to an embodiment of the invention. FIG. 6 is a diagram showing an example of the adjusting circuit 110 in FIG. 1 when operating in the normal mode according to an embodiment of the invention.

As shown in FIG. 5, the adjusting circuit 110 comprises a controller 1101, a plurality of multiplexers 1102_V, 1102_H, 1102_0-1102_N, and a plurality of delay path blocks/circuits 1103_C, 1103_V, 1103_H, 1103_0-1103_N (i.e. delay circuits). The number of multiplexers 1102_0-1102_N (or the number of delay path blocks 1103_0-1103_N) is equal to the total numbers of signals D[0]-D[7], and in this embodiment the value of N is equal to 7 (but not limited). In other embodiment, the value N may be equal to 11 if the bit data signals are D[0]-D[11].

The processing circuit 105 in the adjusting mode for example generates and outputs the clock signal CLK into the delay path block 1103_C and generates and outputs the training data signals APS into the multiplexers 1102_V, 1102_H, 1102_0-1102_N, respectively.

The multiplexer 1102_V has a first input (corresponding to bit '0') coupled to the training data signal APS, a second input (corresponding to bit '1') coupled to a response signal APV' corresponding to a delayed training data signal APV which is delayed by the delay path block 1103_V from the training data signal APS, and an output coupled to the input of the delay path block 1103_V. The multiplexer 1102_H has a first input coupled to the training data signal APS, a second input coupled to a response signal APH' corresponding to a delayed training data signal APH which is delayed by the delay path block 1103_H from the training data signal APS, and an output coupled to the input of the delay path block 1103_H. The multiplexers 1102_0-1102_N respectively have first inputs respectively coupled to the training data signals APS, second inputs respectively coupled to response signals AP_0'-AP_N' corresponding to delayed training data signals AP_0-AP_N which are respectively delayed by the delay path blocks 1103_0-1103_N from the training data signals APS, and outputs respectively coupled to the inputs of the delay path blocks 1103_0-1103_N.

Each of delay path blocks 1103_C, 1103_V, 1103_H, 1103_0-1103_N comprises M delay units D1 that are connected in series, and each delay unit D1 comprises a corresponding multiplexer and a corresponding delay buffer/element. The corresponding multiplexer in the each delay unit D1 has a first input connected to an output of the corresponding delay buffer which has an input connected to the input of the each delay unit D1, and the corresponding multiplexer has a second input directly connected to the input of the each delay unit D1 and it has an output connected to the output of the each delay unit D1. In addition, the corresponding delay buffer can be used to delay its input signal with a specific unit delay amount such as 2 ns (but not limited) to generate its output signal, and the specific unit delay amount may be fixed or adjustable. For each delay unit D1 in each delay path blocks 1103_C, 1103_V, 1103_H, 1103_0-1103_N, the controller 1101 can control such delay unit D1 determining whether to output a delayed input signal having 2 ns signal delay or a non-delayed input signal. Thus, for a delay path block such as 1103_C, 1103_V, 1103_H, 1103_0-1103_N, the controller 1101 can control the delay path block delaying the input signal of the delay path block with an adjustable delay amount such as zero, 2 ns, 2*2 ns, 3*2 ns, . . . , or M*2 ns to generate the output signal of delay path block.

In this embodiment, when the image sensor apparatus 100 enters the adjusting mode, the controller 1101 initially controls the multiplexers 1102_V, 1102_H, 1102_0-1102_N selecting the training data signal APS as the outputs of multiplexers 1102_V, 1102_H, 1102_0-1102_N respectively. Then, for applying a plurality of preliminary delay amounts into corresponding input signals, the controller 1101 controls the delay path blocks 1103_C, 1103_V, 1103_H, 1103_0-1103_N respectively delaying the clock signal CLK and corresponding training data signals APS with the plurality of preliminary delay amounts to generate and output the delayed clock signal CLK' and delayed training signals APV, APH, AP_0-AP_N to the ports P_C, P_V, P_H, P_0-P_N respectively. Each of the ports P_C, P_V, P_H, P_0-P_N are implemented by using an input/output (I/O) buffer which can be arranged to output a signal inside the chip to the outside and/or receive and transmit the signal outside the chip to the inside. In addition, in this embodiment, the plurality of preliminary delay amounts are identical such as a portion of the maximum delay amount provided by a delay path block, and the portion of the maximum delay amount may be half of the maximum delay amount. In other embodiments, the preliminary delay amounts may be partially different or completely different.

After the delayed clock signal CLK' and the delayed training data signals APV, APH, AP_0-AP_N have been transmitted to the outside, the ports P_C, P_V, P_H, P_0-P_N are arranged to respectively receive a response clock signal CLK" and response data signals APV', APH', AP_0'-AP_N' associated with the delayed clock signal CLK' and the delayed training data signals APV, APH, AP_0-AP_N. These response signals CLK", APV', APH', AP_0'-AP_N' are transmitted back from the external circuit 101 or from the PCB routing lines/traces, and can be used to reflect the different lengths of the different PCB routing lines/traces. The response signals APV', APH', AP_0'-AP_N' are fed into the second inputs of multiplexers 1102_V, 1102_H, 1102_0-1102_N.

Then, the controller 1101 controls the multiplexers 1102_V, 1102_H, 1102_0-1102_N selecting the response signals APV', APH', AP_0'-AP_N' as the outputs respectively. For adjusting the applied delay amounts, the controller 1101 then controls the delay path blocks 1103_V, 1103_H, 1103_0-1103_N increasing or decreasing their delay amounts to generate and output the delayed response signals APV", APH", AP_0"-AP_N", and it compares the delayed response signals APV", APH", AP_0"-AP_N" with the signal edge of the response clock signal CLK" respectively to determine resultant delay amounts which are applied by the delay path blocks 1103_V, 1103_H, 1103_0-1103_N.

For example, the controller 1101 sequentially controls the delay path block 1103_V delaying the response signal APV' with different delay amounts to generate the delayed response signals APV" having different signal delays. The controller 1101 sequentially compares the delayed response signals APV" having different signal delays with the response clock signal CLK" to determine the resultant delay amount provided by the delay path block 1103_V. Similarly, the controller 1101 can also determine the resultant delay amounts of different delay path blocks.

After determining the resultant delay amounts generated by the delay path blocks 1103_V, 1103_H, 1103_0-1103_N, the controller 1101 uses the resultant delay amounts of 1103_C, 1103_V, 1103_H, 1103_0-1103_N to respectively delay the raw sensor data signals. As shown in FIG. 6, the controller 1101 in the normal mode controls the multiplexers 1102_V, 1102_H, 1102_0-1102_N selecting the signals (i.e. Vsync, Hsync, D[0]-D[7]) at their second inputs as their output signals. Then, the delay path blocks 1103_V, 1103_H, 1103_0-1103_N are arranged to apply their determined resultant delay amounts into the signals Vsync, Hsync, D[0]-D[7] so as to delay the signals Vsync, Hsync, D[0]-D[7] with their determined resultant delay amounts to generate the delayed signals Vsync', Hsync', D[0]'-D[7]' at their outputs wherein the delayed signals Vsync', Hsync', D[0]'-D[7]' are then outputted to the external circuit 101 via the PCB routing lines/traces so that the delayed signals Vsync', Hsync', D[0]'-D[7] ', transferred via the PCB routing lines/traces and then seen by the external circuit 101 can have an increased valid range or a maximized valid range.

Figure 7:
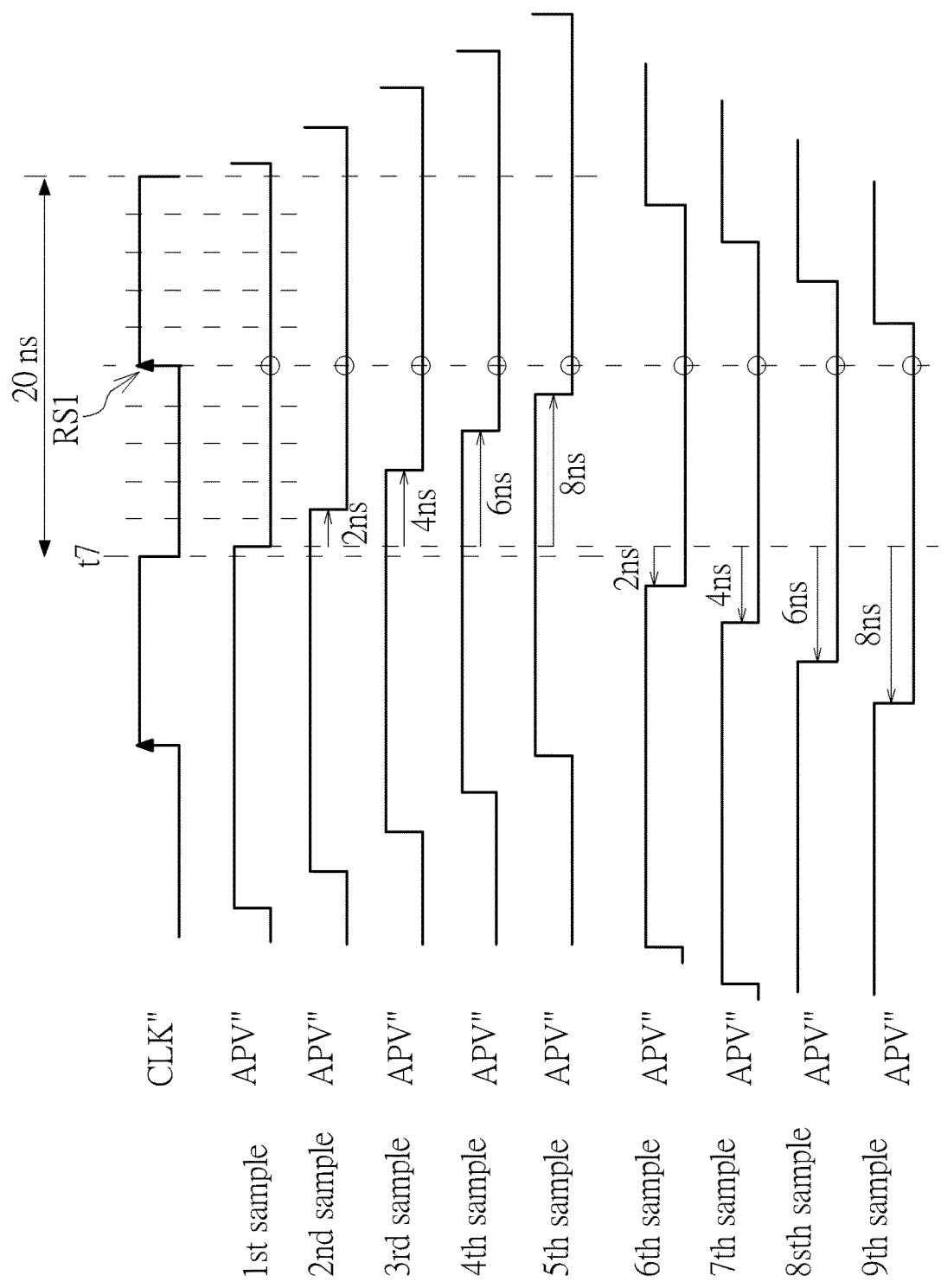
FIG. 7 is a diagram showing an example of the controller controlling the delay path block sequentially applying the different delay amounts into a response signal such as APV' of FIG. 5 in the adjusting mode to sequentially generate the delayed response signals APV" having different signal delays according to an embodiment of the invention.

FIG. 7 is a diagram showing an example of the controller 1101 controlling the delay path block 1103_V sequentially applying the different delay amounts into a response signal such as APV' of FIG. 5 in the adjusting mode to sequentially generate the delayed response signals APV" having different signal delays according to an embodiment of the invention. For example, the controller 1101 can be arranged to control the delay path block 1103_V delaying an input signal with 0 ns, 2 ns, 0 ns, 6 ns, . . . , 14 ns, or 16 ns to generate an output signal; that is, the maximum delay amount is equal to 16 ns. Initially, the controller 1101 controls the delay path block 1103_V delaying the input signal with the preliminary delay amount such as a half of the maximum delay amount, i.e. 8 ns.

As shown in FIG. 7, for the first sampling operation, the controller 1101 is arranged to sample the response signal APV' of a vertical synchronization signal at the signal edge of the response signal CLK" of the delayed clock signal CLK', and in this situation the first sampled level is equal to a specific logic level such as low level '0'; in another example, the specific logic level may be high level '1'. When the first sampled level is equal to the specific logic level, the controller 1101 determines that the external circuit 101 can correctly sample the vertical synchronization signal outputted by the image sensor apparatus 100 in the condition of the delay amount being equal to half of the maximum delay amount, i.e. 8 ns.

Then, for the second sampling operation, the controller 1101 controls the delay path block 1103_V further delaying the response signal APV' with 2 ns in addition to 8 ns, i.e. the delay amount becomes 10 ns, and it samples the delayed response signal APV" caused by the delay amount 10 ns at the signal edge of the response signal CLK", and in this situation the sampled level is also equal to the specific logic level '0'. When the second sampled level is equal to the specific logic level, the controller 1101 determines that the external circuit 101 can correctly sample the vertical synchronization signal outputted by the image sensor apparatus 100 in the condition of the delay amount being equal to 10 ns.

Similarly, for the third sampling operation, the controller 1101 controls the delay path block 1103_V further delaying the response signal APV' with 4 ns in addition to 8 ns, i.e. the delay amount becomes 12 ns, and it sample the delayed response signal APV" caused by the delay amount 12 ns at the signal edge of the response signal CLK", and in this situation the sampled level is also equal to the specific logic level '0'. For the fourth sampling operation, the controller 1101 controls the delay path block 1103_V further delaying the response signal APV' with 6 ns in addition to 8 ns, i.e. the delay amount becomes 14 ns, and it sample the delayed response signal APV" caused by the delay amount 14 ns at the signal edge of the response signal CLK", and in this situation the sampled level is also equal to the specific logic level '0'. For the fifth sampling operation, the controller 1101 controls the delay path block 1103_V further delaying the response signal APV' with 8 ns in addition to 8 ns, i.e. the delay amount becomes 16 ns (the maximum delay amount), and it sample the delayed response signal APV" caused by the delay amount 16 ns at the signal edge of the response signal CLK", and in this situation the sampled level is also equal to the specific logic level '0'. In the above-mentioned sampling operations, the controller 1101 determines that the external circuit 101 can correctly sample the vertical synchronization signal outputted by the image sensor apparatus 100 even though the delay amount is adjusted as 10 ns, 12 ns, 14 ns, or 16 ns.

Further, for the sixth sampling operation, the controller 1101 controls the delay path block 1103_V decreasing a delay amount 2 ns from the half (i.e. 8 ns) of the maximum delay amount to delay the response signal APV' with 6 ns, and it samples the delayed response signal APV" caused by the delay amount 6 ns at the signal edge RS1 of the response signal CLK", and in this situation the sampled level is also equal to the specific logic level '0'. Similarly, for the seventh sampling operation, the controller 1101 controls the delay path block 1103_V decreasing a delay amount 0 ns from the half (i.e. 8 ns) of the maximum delay amount to delay the response signal APV' with 0 ns, and it samples the delayed response signal APV" caused by the delay amount 0 ns at the signal edge RS1 of the response signal CLK", and in this situation the sampled level is also equal to the specific logic level '0'. For the eighth sampling operation, the controller 1101 controls the delay path block 1103_V decreasing a delay amount 6 ns from the half (i.e. 8 ns) of the maximum delay amount to delay the response signal APV' with 2 ns, and it sample the delayed response signal APV" caused by the delay amount 2 ns at the signal edge RS1 of the response signal CLK", and in this situation the sampled level is also equal to the specific logic level '0'. For the ninth sampling operation, the controller 1101 controls the delay path block 1103_V decreasing a delay amount 8 ns from the half (i.e. 8 ns) of the maximum delay amount to delay the response signal APV' with zero nanoseconds, and it sample the delayed response signal APV" caused by the delay amount 0 ns at the signal edge RS1 of the response signal CLK", and in this situation the sampled level is also equal to the specific logic level '0'. In the above-mentioned sampling operations, the controller 1101 determines that the external circuit 101 can correctly sample the vertical synchronization signal outputted by the image sensor apparatus 100 even though the delay amount is adjusted as 6 ns, 0 ns, 2 ns, or zero.

Based on the results of the above-mentioned sampling operations in FIG. 7, the controller 1101 can determine that it is not needed to further adjust the delay amount of the delay path block 1103_V to delay a vertical synchronization signal after the delay amount is configured as an initial value (i.e. preliminary delay amount) such as 8 ns which is equal to the delay amount of the delay path block 1103_C, and it can determine that the resultant delay amount of the delay path block 1103_V is equal to 8 ns. This operation is also applied for the operations of adjusting the delay amounts of the delay path block 1103_H and 1103_0-1103_N to determine their resultant delay amounts.

Figure 8:
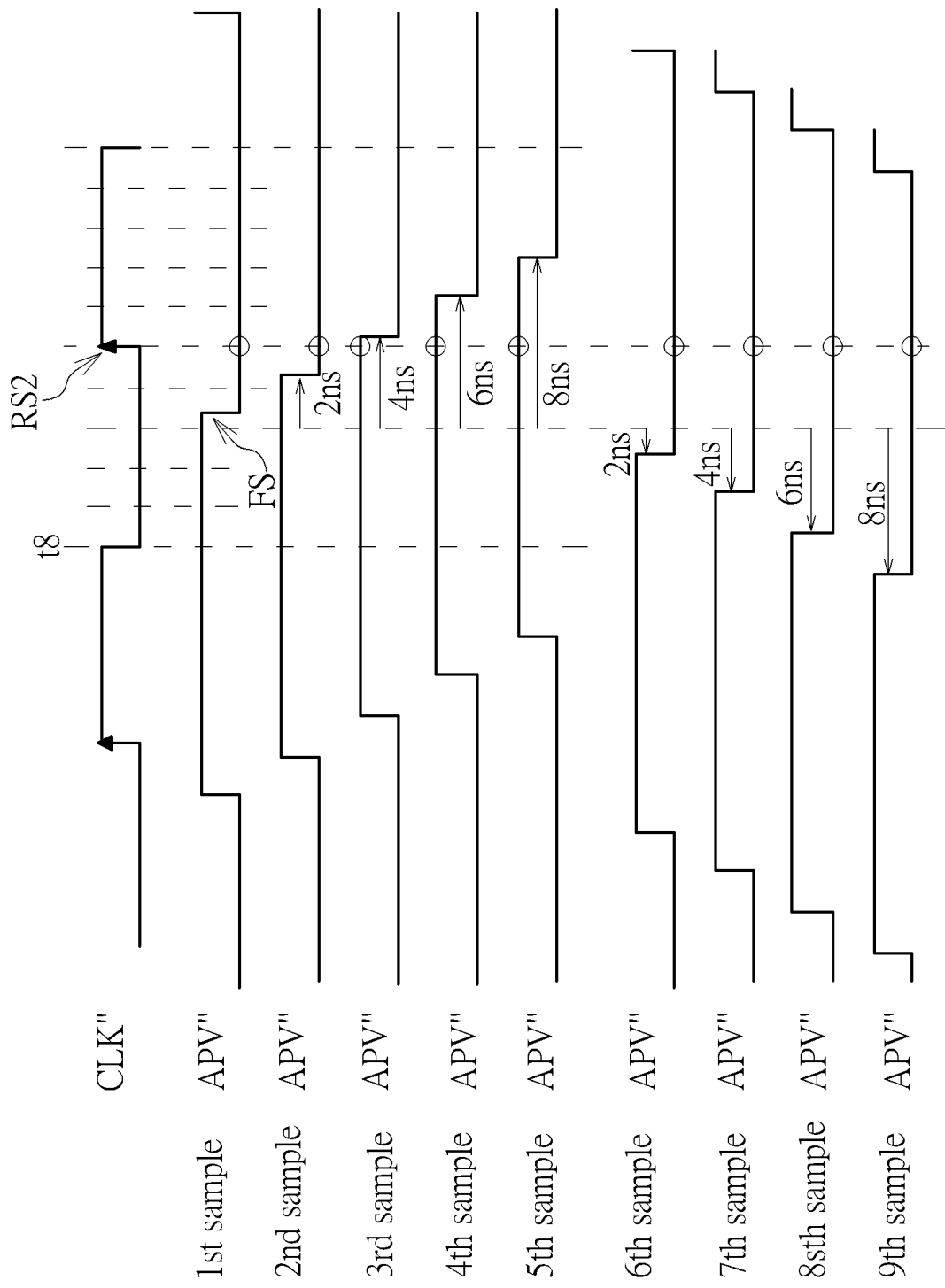
FIG. 8 is a diagram showing a different example of the controller controlling the delay path block sequentially applying the different delay amounts in the adjusting mode for a response signal such as APV' of FIG. 5 to sequentially generate the delayed response signals APV" having different signal delays according to another embodiment of the invention.

FIG. 8 is a diagram showing a different example of the controller 1101 controlling the delay path block 1103_V sequentially applying the different delay amounts in the adjusting mode for a response signal such as APV' of FIG. 5 to sequentially generate the delayed response signals APV" having different signal delays according to another embodiment of the invention. As shown in FIG. 8, for the first sampling operation, the controller 1101 is arranged to sample the response signal APV' of a vertical synchronization signal at the signal edge RS2 of the response signal CLK" of the delayed clock signal CLK', and in this situation the first sampled level is equal to the specific logic level such as '0'; in another example, the specific logic level may be '1'. When the first sampled level is equal to the specific logic level, the controller 1101 determines that the external circuit 101 can correctly sample the vertical synchronization signal outputted by the image sensor apparatus 100 in the condition of the applied delay amount being equal to half of the maximum delay amount, i.e. 8 ns.

For the second sampling operation, the controller 1101 controls the delay path block 1103_V further delaying the response signal APV' with 2 ns in addition to 8 ns, i.e. the delay amount becomes 10 ns, and it sample the delayed response signal APV" caused by the delay amount 10 ns at the signal edge RS2 of the response signal CLK", and in this situation the sampled level is also equal to the specific logic level '0'. When the second sampled level is equal to the specific logic level, the controller 1101 determines that the external circuit 101 can correctly sample the vertical synchronization signal outputted by the image sensor apparatus 100 in the condition of the applied delay amount being equal to 10 ns.

Similarly, for the third sampling operation, the controller 1101 controls the delay path block 1103_V further delaying the response signal APV' with 4 ns in addition to 8 ns, i.e. the delay amount becomes 12 ns, and it sample the delayed response signal APV'" caused by the delay amount 12 ns at the signal edge RS2 of the response signal CLK", and in this situation the sampled level is high. When the third sampled level is high different from low, the controller 1101 determines that the external circuit 101 cannot correctly sample the vertical synchronization signal outputted by the image sensor apparatus 100 in the condition of the applied delay amount being equal to 10 ns. For the fourth sampling operation, the controller 1101 controls the delay path block 1103_V further delaying the response signal APV' with 6 ns in addition to 8 ns, i.e. the delay amount becomes 14 ns, and it sample the delayed response signal APV'" caused by the delay amount 14 ns at the signal edge RS2 of the response signal CLK", and in this situation the sampled level is high and the controller 1101 determines that the external circuit 101 cannot correctly sample the vertical synchronization signal outputted by the image sensor apparatus 100 in the condition of the applied delay amount being equal to 14 ns. For the fifth sampling operation, the controller 1101 controls the delay path block 1103_V further delaying the response signal APV' with 8 ns in addition to 8 ns, i.e. the delay amount becomes 16 ns (the maximum delay amount), and it sample the delayed response signal APV'" caused by the delay amount 16 ns at the signal edge RS2 of the response signal CLK", and in this situation the sampled level is high and the controller 1101 determines that the external circuit 101 cannot correctly sample the vertical synchronization signal outputted by the image sensor apparatus 100 in the condition of the delay amount being equal to 16 ns.

Further, for the sixth sampling operation, the controller 1101 controls the delay path block 1103_V decreasing a delay amount 2 ns from the half (i.e. 8 ns) of the maximum delay amount to delay the response signal APV' with 6 ns, and the sampled level is low. Similarly, for the seventh sampling operation, the controller 1101 controls the delay path block 1103_V decreasing a delay amount 0 ns from the half (i.e. 8 ns) of the maximum delay amount to delay the response signal APV' with 0 ns, and the sampled level is low. For the eighth sampling operation, the controller 1101 controls the delay path block 1103_V decreasing a delay amount 6 ns from the half (i.e. 8 ns) of the maximum delay amount to delay the response signal APV' with 2 ns, and the sampled level is low. For the ninth sampling operation, the controller 1101 controls the delay path block 1103_V decreasing a delay amount 8 ns from the half (i.e. 8 ns) of the maximum delay amount to delay the response signal APV' with zero nanoseconds, and the sampled level is low.

Based on the results of the above-mentioned sampling operations, the controller 1101 can know that it sampled the low level for three times when increasing the delay amount from the half of maximum delay amount to the maximum delay amount step by step, and thus the controller 1101 is arranged to decrease a particular delay amount, which is equal to three times of a unit delay amount (i.e. 2 ns), from the half of maximum delay amount so as to determine the resultant delay amount. In this example, such decreased delay amount is equal to 6 ns, and the resultant delay amount is equal to 2 ns different from the preliminary delay amount such as the half (8 ns) of the maximum delay amount.

As shown in FIG. 8, the response signal APV', transmitted back from the external circuit 101, is associated with the training data signal APS (corresponding to a vertical synchronization signal) that is delayed with the preliminary delay amount 8 ns and then outputted to the external circuit 101 via the PCB routing line. When the resultant delay amount is configured as 2 ns, the falling edge FS of the signal APV' can be shifted and become significantly close or near to the timing t8. Thus, when the image sensor apparatus 100 is in the normal mode, the timing of a signal edge (e.g. rising edge) of the clock signal CLK' seen by the external circuit 101 can be closer to or near to a center point of a level (e.g. low level) of such vertical synchronization signal seen by the external circuit 101. It is easy for the external circuit 101 to correctly sample and obtain the level of such vertical synchronization signal.

Similarly, in other embodiments, if the controller 1101 knows that it sampled the low level three times (not limited) when decreasing the delay amount from the half of maximum delay amount to zero step by step, then the controller 1101 is arranged to increase a delay amount, which is equal to three times of a unit delay amount (i.e. 2 ns), from the half of maximum delay amount so as to determine the resultant delay amount (i.e. 14 ns).

The above-mentioned operations are suitable for and applied into the horizontal synchronization signals and bit data signals to determine corresponding resultant delay amounts.

Figure 9:
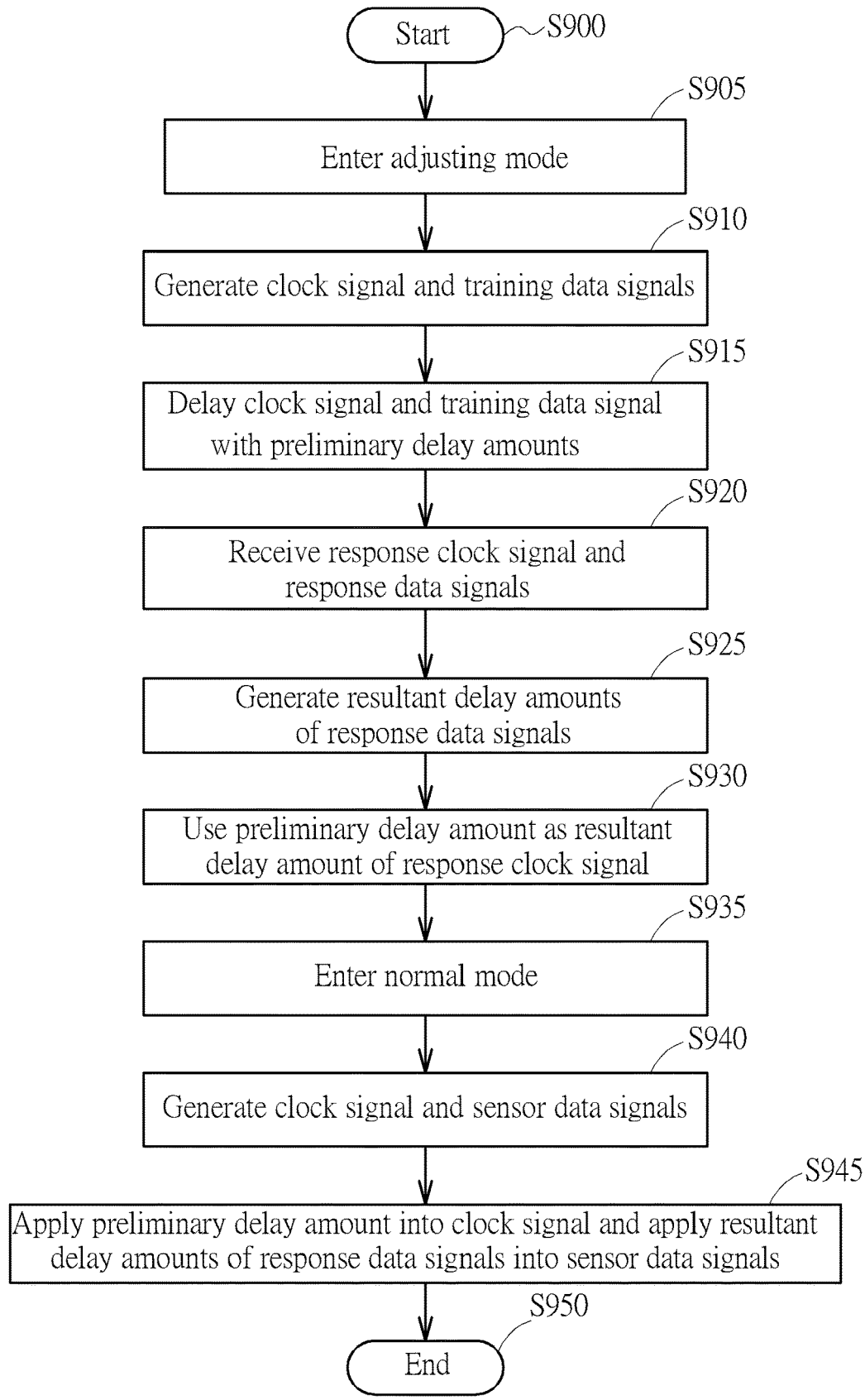
FIG. 9 is a diagram illustrating the flow of the delay adjusting operation according to an embodiment of the invention.

To more the readers more clearly understand the operations of the invention, FIG. 9 is provided. FIG. 9 is a diagram illustrating the flow of the delay adjusting operation according to an embodiment of the invention. Provided that substantially the same result is achieved, the steps of the flowchart shown in FIG. 9 need not be in the exact order shown and need not be contiguous, that is, other steps can be intermediate. Steps are detailed in the following:

Step S900: Start;

Step S905: Enter an adjusting mode;

Step S910: Generate a clock signal and training data signals;

Step S915: Delay the clock signal and the training data signal with a plurality of preliminary delay amounts to generate and output a delayed clock signal and delayed training data signals to the external circuit via ports;

Step S920: Receive a response clock signal and response data signals from the ports, wherein the response clock signal and the response data signals are respectively associated with the delayed clock signal and the delayed data signals;

Step S925: Generate resultant delay amounts of the response data signals; wherein for a response data signal, the step performs sequentially applying different delay amounts into the response data signal to generate delayed response data signals, and then performs determining a resultant delay amount according to the delayed response data signals and the response clock signal;

Step S930: Use a preliminary delay amount as a resultant delay amount of the response clock signal;

Step S935: Enter a normal mode;

Step S940: Generate the clock signal and sensor data signals in the normal mode;

Step S945: Apply the preliminary delay amount into the clock signal and apply the resultant delay amounts of the response data signals into the sensor data signals to generate and output delayed communication signals which are to be outputted to the external circuit; and Step S950: End.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image sensor apparatus to be externally coupled to an external circuit through a circuit routing design, comprising:
    a processing circuit, for generating and outputting the clock signal and sensor data signals; and
    an adjusting circuit, coupled to the processing circuit, arranged for compensating an unbalance of the circuit routing design by automatically determining resultant delay amounts for the sensor data signals, applying a preliminary delay amount into the clock signal and applying the resultant delay amounts into the sensor data signals to generate and output delayed clock signal and delayed sensor data signals to the external circuit through the circuit routing design.

2. The image sensor apparatus of claim 1, wherein the processing circuit is arranged for generating and outputting the clock signal and training data signals in an adjusting mode and arranged for generating and outputting the clock signal and the sensor data signals in a normal mode, and the training data signals are used to test the circuit routing design.

3. The image sensor apparatus of claim 2, wherein the adjusting circuit is arranged for:
    respectively delaying the clock signal and the training data signals with a plurality of preliminary delay amounts to generate and output a delayed clock signal and delayed training data signals to the external circuit via ports;
    respectively receiving a response clock signal and response data signals from the ports, the response clock signal and the response data signals being respectively associated with the delayed training clock signal and the delayed training data signals;
    generating the resultant delay amounts of the response data signals, and the generating step comprises:
        for a response data signal:
            sequentially applying different delay amounts into the response data signal to generate delayed response data signals; and
            determining a resultant delay amount according to the delayed response data signals and the response clock signal;
    using the preliminary delay amount as a resultant delay amount of the response clock signal; and
    applying the preliminary delay amount into the clock signal and applying the resultant delay amounts of the response data signals into the sensor data signals to generate and output delayed communication signals which are to be outputted to the external circuit.

4. The image sensor apparatus of claim 3, wherein the adjusting circuit comprises:
    a first delay path circuit associated with the clock signal, for applying the preliminary delay amount into the block signal;
    a plurality of multiplexers, respectively for receiving the plurality of training data signals and the response data signals in the adjusting mode, and for receiving the sensor data signals in the normal mode;
    a plurality of second delay path circuits respectively coupled to output signals of the plurality of multiplexers, for respectively applying corresponding delay amounts into the output signals; and
    a controller, coupled to the first delay path circuit and the plurality of second delay path circuits, for controlling the first delay path circuit and the plurality of second delay path circuits, and for controlling the plurality of second delay path circuits applying the resultant delay amounts for the sensor data signals;
    wherein each delay path circuit comprises a plurality of delay units connected in series, and each delay unit is controlled by the controller to determine whether apply a specific unit delay amount of the each delay unit.

5. The image sensor apparatus of claim 2, wherein the training data signals are formed by an identical alternating pattern signal.

6. The image sensor apparatus of claim 1, wherein the preliminary delay amount is half of a maximum delay amount of a delay path circuit included within the adjusting circuit.

7. The image sensor apparatus of claim 1, wherein the adjusting circuit is arranged to increase or maximize a valid signal timing range of the sensor data signals to be sampled by using the clock signal.

8. A method of an image sensor apparatus to be externally coupled to an external circuit through a circuit routing design, comprising:
    generating and outputting the clock signal and sensor data signals; and
    using an adjusting circuit to compensate an unbalance of the circuit routing design by automatically determining resultant delay amounts for the sensor data signals, applying a preliminary delay amount into the clock signal and applying the resultant delay amounts into the sensor data signals to generate and output delayed clock signal and delayed sensor data signals to the external circuit through the circuit routing design.

9. The method of claim 8, further comprising:
    generating and outputting the clock signal and training data signals in an adjusting mode; and
    generating and outputting the clock signal and the sensor data signals in a normal mode;
    wherein the training data signals are used to test the circuit routing design.

10. The method of claim 9, further comprising:
    respectively delaying the clock signal and the training data signal with a plurality of preliminary delay amounts to generate and output a delayed clock signal and delayed training data signals to the external circuit via ports;
    respectively receiving a response clock signal and response data signals from the ports, the response clock signal and the response data signals being respectively associated with the delayed training clock signal and the delayed training data signals;
    generating the resultant delay amounts of the response data signals, and the generating step comprises:
        for a response data signal:
            sequentially applying different delay amounts into the response data signal to generate delayed response data signals; and
            determining a resultant delay amount according to the delayed response data signals and the response clock signal;
    using the preliminary delay amount as a resultant delay amount of the response clock signal; and
    applying the preliminary delay amount into the clock signal and applying the resultant delay amounts of the response data signals into the sensor data signals to generate and output delayed communication signals which are to be outputted to the external circuit.

11. The method of claim 9, wherein the training data signals are formed by an identical alternating pattern signal.

12. The method of claim 8, wherein the preliminary delay amount is half of a maximum delay amount of a delay path circuit included within the adjusting circuit.

13. The method of claim 8, wherein the adjusting circuit is arranged to increase or maximize a valid signal timing range of the sensor data signals to be sampled by using the clock signal.

* * * * *